United States Patent
Hayashi

(10) Patent No.: US 8,059,193 B2
(45) Date of Patent: Nov. 15, 2011

(54) IMAGE PICKUP APPARATUS HAVING A CAMERA BODY AND DISPLAY UNIT

(75) Inventor: Haruo Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 11/436,647

(22) Filed: May 19, 2006

(65) Prior Publication Data
US 2006/0274184 A1     Dec. 7, 2006

(30) Foreign Application Priority Data

Jun. 6, 2005     (JP) ................ P2005-164966

(51) Int. Cl.
*H04N 5/225* (2006.01)
*H04N 5/222* (2006.01)
(52) U.S. Cl. .............. 348/373; 348/333.06; 348/376
(58) Field of Classification Search ............ 348/207.99, 348/333.01, 333.06, 373, 375, 376; 396/176–178
See application file for complete search history.

(56) References Cited

U.S. PATENT DOCUMENTS

| | | | |
|---|---|---|---|
| 4,757,388 A * | 7/1988 | Someya et al. ............ 348/211.6 |
| 5,659,361 A * | 8/1997 | Jin ............................... 348/375 |
| 5,738,321 A * | 4/1998 | Moriyasu .................. 248/274.1 |
| 6,067,116 A * | 5/2000 | Yamano et al. .............. 348/372 |
| 6,501,908 B1 * | 12/2002 | Maruyama ..................... 396/59 |
| 6,571,056 B2 * | 5/2003 | Shimamura et al. ........... 396/27 |
| 7,202,901 B1 * | 4/2007 | Hattori et al. ........... 348/333.06 |
| 7,477,318 B2 * | 1/2009 | Nakamura ................... 348/376 |
| 2002/0081114 A1 | 6/2002 | Aizawa et al. |
| 2002/0122666 A1 | 9/2002 | Miyazaki et al. |
| 2004/0212709 A1 * | 10/2004 | Lee et al. .................. 348/333.01 |
| 2004/0231105 A1 * | 11/2004 | Ahn ................................ 16/367 |
| 2006/0051070 A1 * | 3/2006 | Itsukaichi ..................... 386/117 |
| 2008/0252772 A1 * | 10/2008 | Nozaki .......................... 348/340 |

FOREIGN PATENT DOCUMENTS

| | | |
|---|---|---|
| EP | 0 671 849 A1 | 3/1995 |
| EP | 0 708 557 A1 | 4/1996 |
| JP | 62-036985 | 2/1987 |
| JP | 64-004731 | 1/1989 |
| JP | 08-294029 A | 11/1996 |
| JP | 2001-024914 A | 1/2001 |
| JP | 2002-169198 A | 6/2002 |
| JP | 2003-315891 A | 11/2003 |

OTHER PUBLICATIONS

Communication from European Patent Office for Application No. 06114956.3-2202 dated Aug. 29, 2006. Office Communication of Patent Application No. 06114956.3 regarding Oral Proceedings on May 14, 2009, mailed Apr. 29, 2009 (EPO).
Japanese Office Action issued Sep. 15, 2009 for corresponding Japanese Application No. 2005-164966.

* cited by examiner

*Primary Examiner* — David Ometz
*Assistant Examiner* — Carramah J Quiett
(74) *Attorney, Agent, or Firm* — Rader, Fishman & Grauer PLLC

(57) ABSTRACT

Disclosed is an image pickup device which includes a camera body and a display unit serving as a monitor, supported for turning on an upper surface of the camera body and capable of being folded in a horizontal position on the upper surface of the camera body and capable of being set in a standing position at an angle to the upper surface of the camera body. A first recess capable holding the folded display unit therein is formed in the upper surface of the camera body, and the display unit has a back surface which is substantially flush with the upper surface of the camera body when the display unit is held in the first recess.

7 Claims, 13 Drawing Sheets

IMAGE PICKUP APPARATUS HAVING A CAMERA BODY AND DISPLAY UNIT

CROSS REFERENCES TO RELATED APPLICATIONS

The present invention contains subject matter related to Japanese Patent Application JP 2005-164966 filed in the Japanese Patent Office on Jun. 6, 2005, the entire contents of which being incorporated herein by reference.

BACKGROUND OF THE INVENTION

1. Field of the Invention

The present invention relates to an image pickup device, such as a digital still camera (DSC) or a digital video camera (DVC), and, more particularly, to an image pickup device provided with a display unit including a display, such as a liquid crystal display (LCD) or an organic electroluminescence display (OELD).

2. Description of the Related Art

Some image pickup devices, such as DSCs and DVCs are provided with a display unit. The display unit serves as a viewfinder in photographing an object and as a monitor for confirming or appreciating a photographed image of the object after photographing.

A known image pickup device shown in FIG. 14 has a camera body 101 and a foldable display unit 102, such as a LCD, attached to a sidewall of the camera body 101. FIG. 15 shows a known image pickup device disclosed in, for example, JP-A 62-36985 (Patent document 1). The image pickup device shown in FIG. 15 has a camera body 101 and a display unit 102 mounted on a turntable 103 supported for turning on the top wall of the camera body 101 by a shaft 104. The display unit 102 is pivotally supported by pins 105 and 106 on brackets standing respectively from peripheral parts of the turntable 103. The display unit 102 is turned on the pins 105 and 106 to set the display unit 102 in an upright position of a horizontal position. The display unit 102 is set in an upright position and the turntable 103 is turned to change the direction of the screen of the display unit 102.

The known image pickup device having the camera body 101, the turntable 103 supported on the top wall of the cameral body 101 and the display unit 102 mounted on the turntable 103 has the following problems.

(1) The display unit 102 and the turntable 103 protruding from the top wall of the camera body 101 obstruct handling the image pickup device and spoil the aesthetic appearance of the image pickup device.

(2) When the display unit 102 is set in a upright position and the turntable 103 is turned, the display unit 102 is dislocated greatly from the shaft 104 supporting the turntable 103 and disposed with its axis perpendicularly intersecting the optical axis of the image pickup device as shown in FIG. 16.

SUMMARY OF THE INVENTION

It is desirable to provide an image pickup device provided with a display unit which will not obstruct handling the image pickup device and will not spoil the esthetic appearance of the image pickup device when folded down.

It is desirable to provide an image pickup device provided with a display unit which will not be greatly dislocated from the optical axis of the image pickup device when turned so as to face any direction.

According to an embodiment of the present invention, there is provided an image pickup device including: a camera body; and a display unit serving as a monitor, supported for turning on the upper surface of the camera body and capable of being folded in a horizontal position on the upper surface of the camera body and of being set in a standing position at an angle to the upper surface of the camera body; wherein a first recess capable of holding the folded display unit therein is formed in the upper surface of the camera body, and the display unit has a back surface which is substantially flush with the upper surface of the camera body when the display unit is held in the first recess.

Preferably, a second recess is formed continuously with the first recess in the upper surface of the camera body, a display support member is supported by first shafts in the second recess so as to be turnable in a vertical plane containing the optical axis of the camera body, the display unit is attached to the display support member, and the display unit held in the first recess is raised from the first recess so as to project from the upper surface of the camera body by turning the display support member in the second recess.

Preferably, a middle part of the display unit with respect to the width of the display unit is rotatably supported by a second shaft on the display support member, and the display unit raised up from the upper surface of the camera body can be turned on the second shaft substantially through an angle of 360°. Preferably, the second shaft is disposed in a vertical plane containing the optical axis of the camera body.

The display unit is folded down and held in the first recess while the image pickup device is out of use. Therefore, the display unit will not protrude from the upper surface of the camera body, will not obstruct handling the image pickup device and will not spoil the aesthetic appearance of the image pickup device. When the display unit is held in the first recess, the back surface of the display unit is substantially flush with the upper surface of the camera body and the back surface of the display unit merges naturally into the upper surface of the camera body to improve the aesthetic appearance of the image pickup device.

The display unit is turned between a folded position in the first recess and a working position by turning the display support member in the second recess. Therefore, the display support member will not protrude from the upper surface of the camera body and will not spoil the aesthetic appearance of the image pickup device. The display raised from the first recess can be turned on the second shaft substantially through 360°. Since the second shaft is disposed in the vertical plane containing the optical axis of the camera body, the distance of dislocation of the display unit from the optical axis of the camera body can be limited to the least unavoidable distance when the display unit is turned on the second shaft to any angular position.

The known image pickup device having the camera body 101, the turntable 103 supported on the top wall of the cameral body 101 and the display unit 102 mounted on the turntable 103 of FIG. 15 has the following problems.

(1) The display unit 102 and the turntable 103 protruding from the top wall of the camera body 101 obstruct handling the image pickup device and spoil the aesthetic appearance of the image pickup device.

(2) When the display unit 102 is set in a upright position and the turntable 103 is turned, the display unit 102 is dislocated greatly from the shaft 104 supporting the turntable 103 and disposed with its axis perpendicularly intersecting the optical axis of the image pickup device as shown in FIG. 16.

BRIEF DESCRIPTION OF THE DRAWINGS

Embodiments of the present invention will be described in detail based on the following figures, wherein.

DETAILED DESCRIPTION OF THE INVENTION

Figure 1:
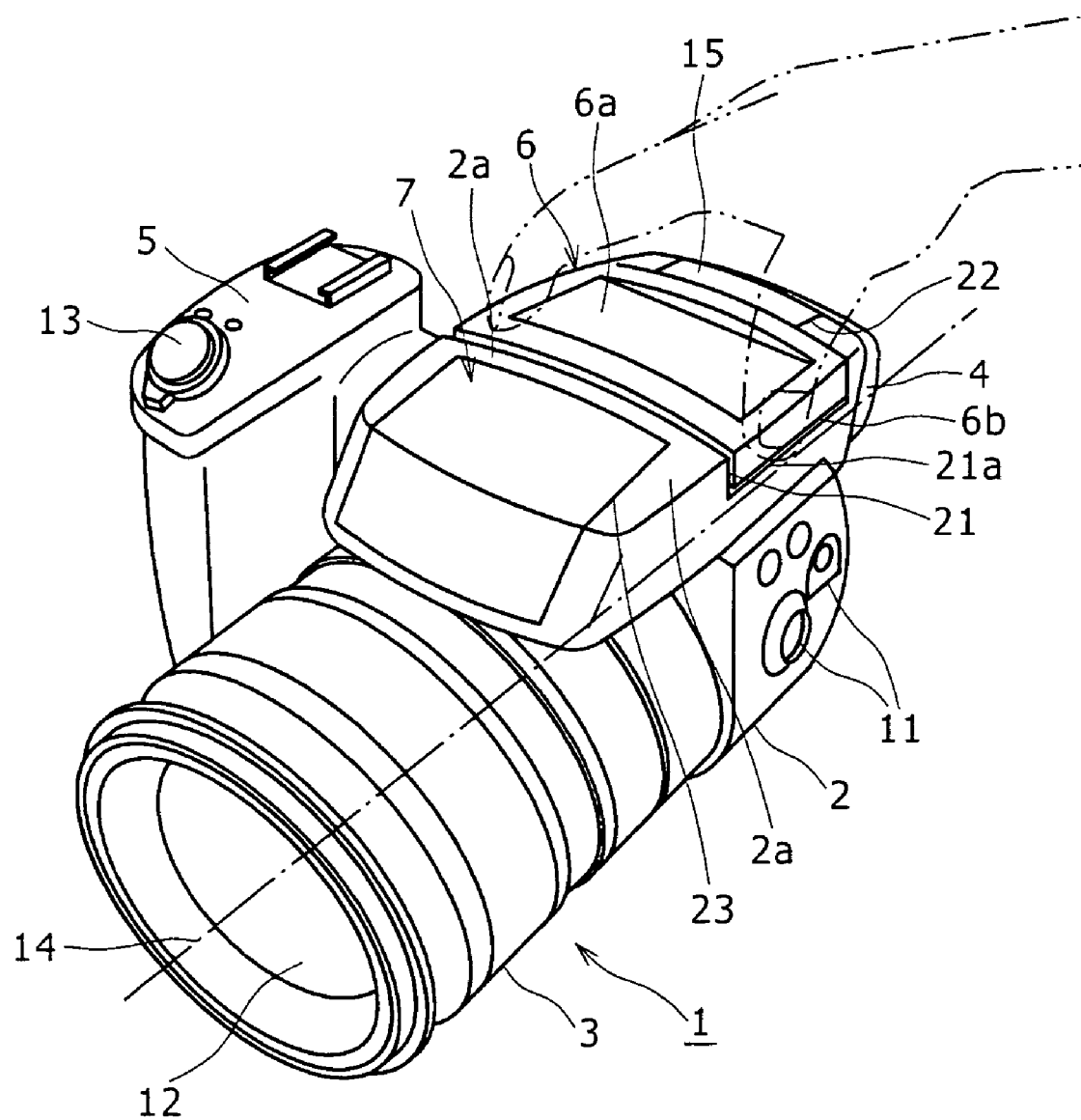
FIG. 1 is a perspective view of an image pickup device in an embodiment according to the present invention, in which a display unit is folded down and held in a first recess.
Figure 2:
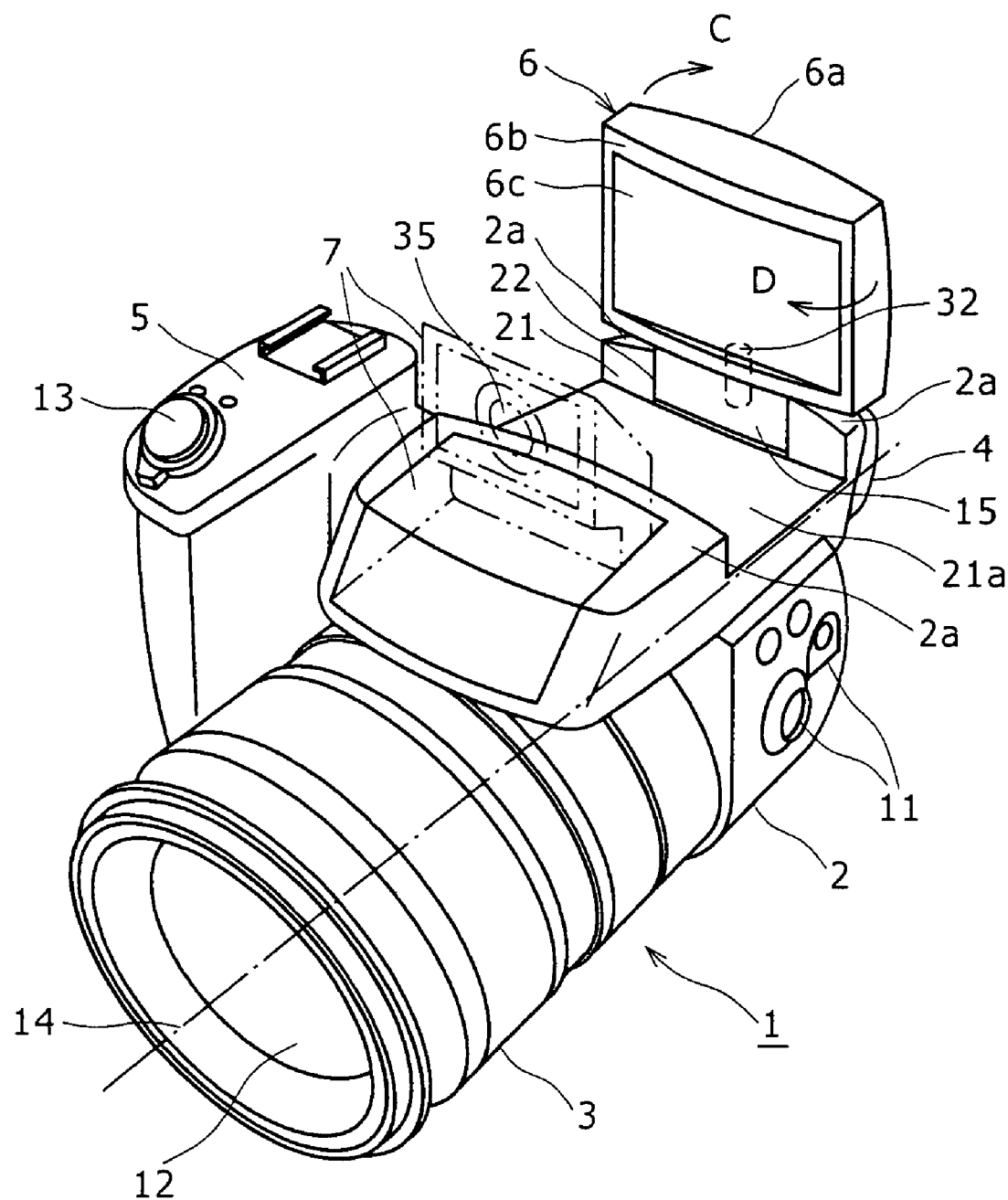
FIG. 2 is a perspective view of the image pickup device shown in FIG. 1, in which the display unit is set in a standing position.
Figure 3:
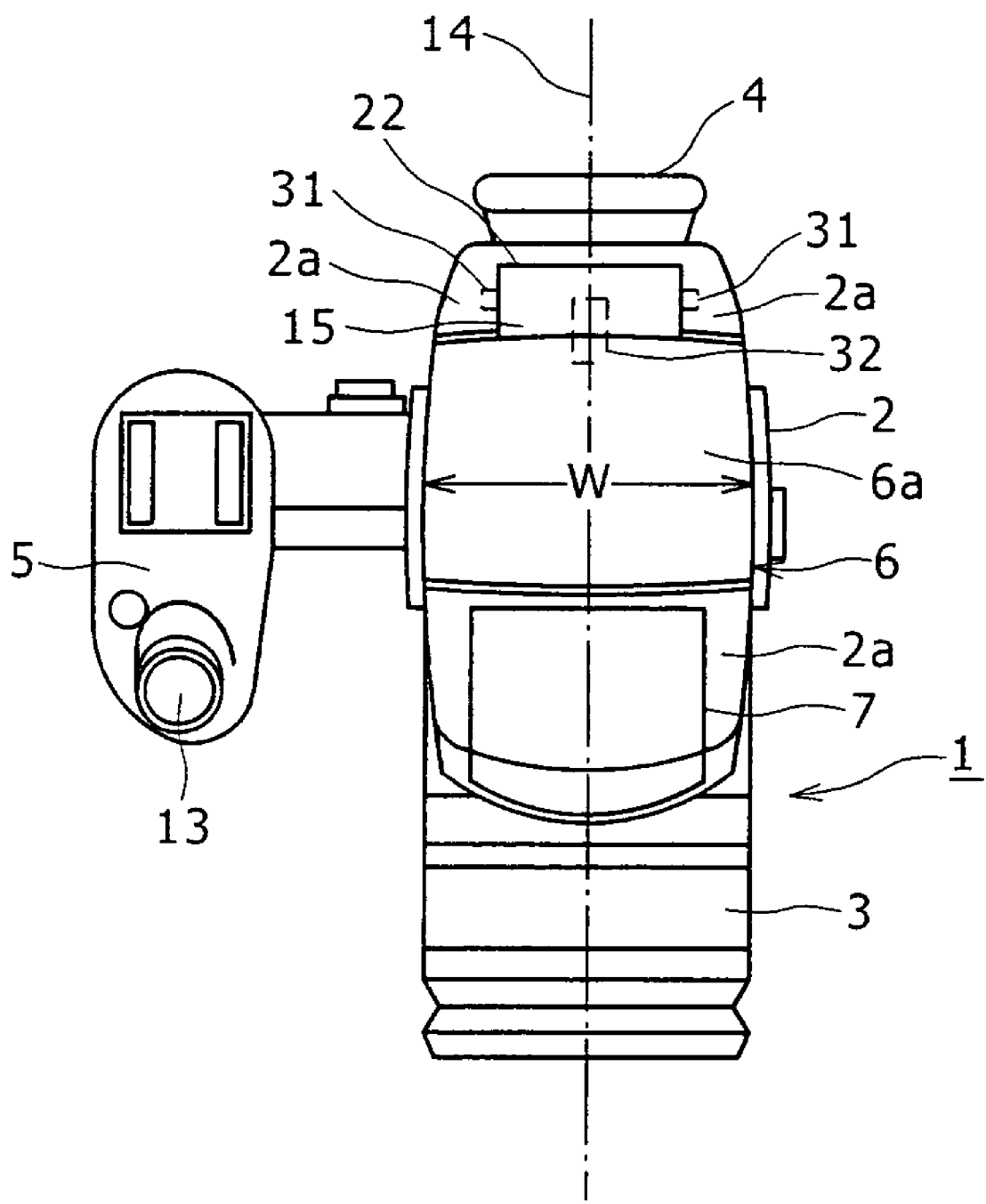
FIG. 3 is a plan view of the image pickup device shown in FIG. 1.
Figure 4:
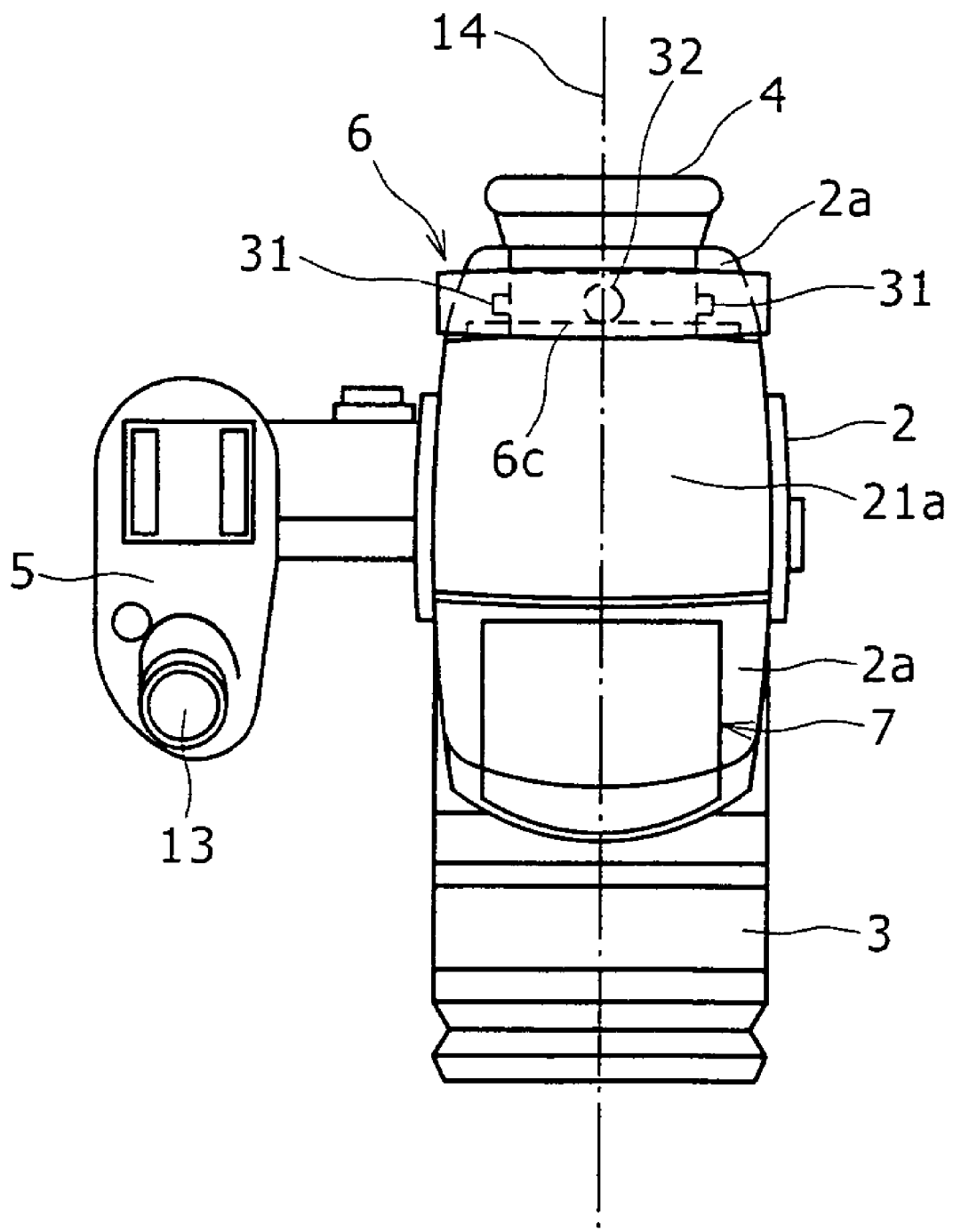
FIG. 4 is a plan view of the image pickup device shown in FIG. 1.

FIG. 1 is a perspective view of an image pickup device in an embodiment according to the present invention, in which a display unit is folded down and held in a first recess, FIG. 2 is a perspective view of the image pickup device shown in FIG. 1, in which the display unit is set in a standing position, FIG. 3 is a plan view of the image pickup device shown in FIG. 1 and FIG. 4 is a plan view of the image pickup device shown in FIG. 1. Referring to FIGS. 1 and 2, an image pickup device 1 has a camera body 2, a lens barrel 3 attached to the front wall of the camera body 2, a viewfinder 4 attached to the back wall of the camera body 2, a grip 5 attached to the right-hand side wall of the camera body 2, a display unit 6 disposed on the top wall of the camera body 2, and a flash unit 7 disposed on the top wall of the camera body 2.

The camera body holds therein electronic devices including a CCD. Operating buttons 11 are arranged on the outer surface of the camera body 2. The lens barrel 3 holds lenses including an objective lens. The grip 5 holds a battery therein. A shutter button 13 is disposed on the top wall of the grip 5. The display unit 6 is rotatably supported by a display support member 15 on a back part of the top wall of the camera body 2. Indicated at 14 is the optical axis of the camera body 2.

The camera body 2 has a curved upper surface 2a having a shape substantially resembling a portion of an arch surface or a part of the reversed side surface of a barrel having a negative curvature. The upper surface 2a is provided with a first recess 21 for holding the display unit 6 therein, a second recess 22 for holding the display support member 15 therein and a third recess 23 for holding the flash unit 7 therein. The first recess 21 has a bottom surface 21a. The display unit 6 has a back surface 6a and a display surface 6b. The back surface 6a, the display surface 6b and the bottom surface 21a of the first recess 21 have substantially equal curvatures, respectively.

The back surface 6a and the display surface 6b of the display unit 6 are nearly flat, curved surfaces of shapes substantially resembling a portion of the side surface of a barrel as shown in FIG. 2. The back surface 6a is substantially flush with the upper surface 2a of the camera body 2 and the display surface 6b is in close contact with the bottom surface 21a of the first recess 21 when the display unit 6 is held in the first recess 21.

The display surface 6b is depressed to form a rectangular frame, and a liquid crystal display (LCD) 6c is fitted in the frame so as to sink beneath the display surface 6b.

The display support member 15 is disposed in the second recess 22. The display support member 15 supports the display unit 6 on the camera body 2 so as to be turnable between the folded position and the raised position.

Figure 5:
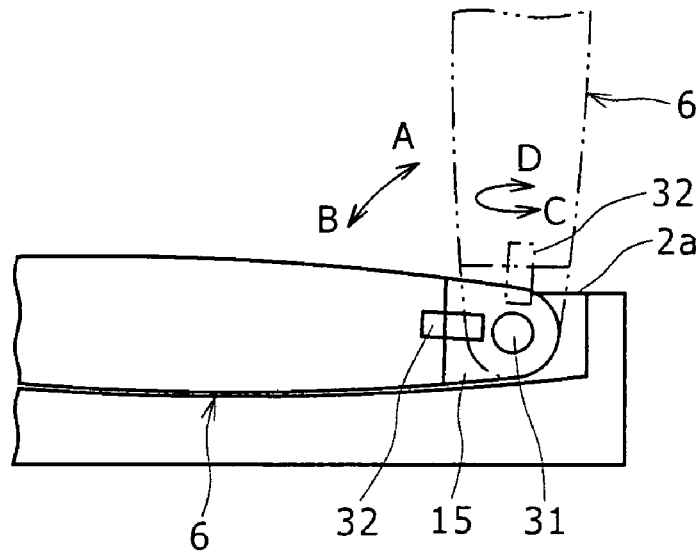
FIG. 5 is a side elevation of a display support member.
Figure 6:
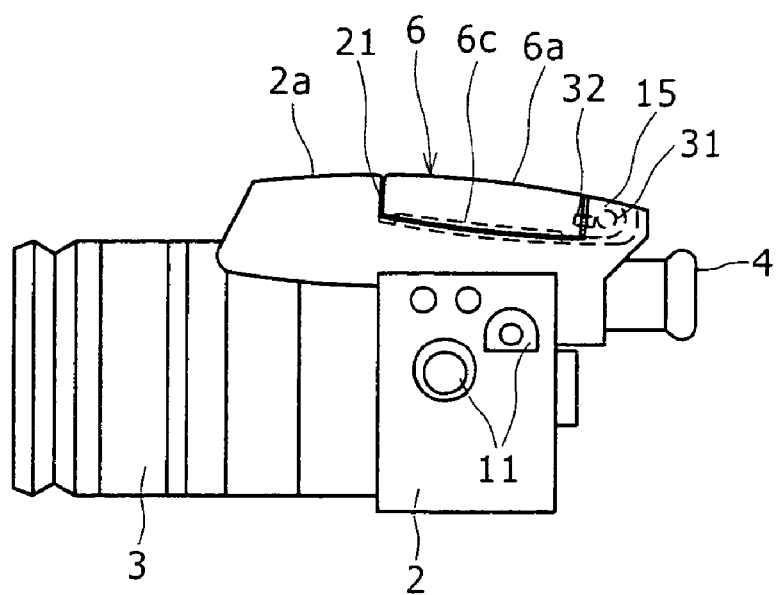
FIG. 6 is a side elevation of the image pickup device shown in FIG. 1, in which the display unit is folded down.

Referring to FIGS. 3 and 5, the display support member 15 is placed in the second recess 22 and is supported on the camera body 2 by a pair of first shafts 31 so as to be turnable in a vertical plane containing the optical axis 14. When the display support member 15 is turned on the first shafts 31 in the direction of the arrow A from a position indicated by continuous lines in FIG. 5 to a position indicated by two-dot chain lines in FIG. 5, the display unit 6 is raised from the first recess 21 and projects from the upper surface 2a of the camera body 2 in a standing position. When the display support member 15 is turned on the fist shafts 31 in the direction of the arrow B from the position indicated by the two-dot chain lines in FIG. 5 to the position indicated by continuous lines in FIG. 5, the display unit 6 is put back into the first recess 21.

Referring to FIG. 3, a second shaft 32 is connected to a middle part of the display unit 6 with respect to the width W of the display unit 6 to support the display unit 6 rotatably on the display support member 15. The display unit 6 raised from the upper surface of the camera body 2 as shown in FIG. 2 can be turned on the second shaft 32 through an angle of about 360° in either of the direction of the arrow C and the direction of the arrow D. In this manner, the second shaft 32 which is disposed in a vertical plane containing the optical axis 14 of the camera body can also be disposed in parallel with the optical axis 14 when the display unit 6 is held in the first recess 21 with its display surface 6b in close contact with the bottom surface 21a of the first recess 21. The flash unit 7, similarly to the display unit 6, can be turned up and down relative to the camera body 2. The flash unit 7 is held in the second recess 23 as indicated by continuous lines in FIG. 2 when the same is out of use. The flash unit 7 is raised up as indicated by two-dot chain lines in FIG. 2 to illuminate an object with light emitted by a flash lamp 35 when the same is in use.

The operation and effect of the image pickup device 1 will be described. The display unit 6 is held in the first recess 21 with its display surface 6b in close contact with the bottom surface 21a of the first recess 21 as shown in FIG. 1 when the display unit 6 is out of use. In this state, the back surface 6a of the display unit 6 is flush with the upper surface of the camera body 2. A peripheral part, forming the frame, of the display surface 6b is in contact with the bottom surface 21a of the first recess 21 and the screen of the LCD 6c is spaced from the bottom surface 21a of the first recess 21. Thus, the LCD 6c is protected. Frictional resistance acting on the first shafts 31 holds the display unit 6 in the first recess 21.

Figure 7:
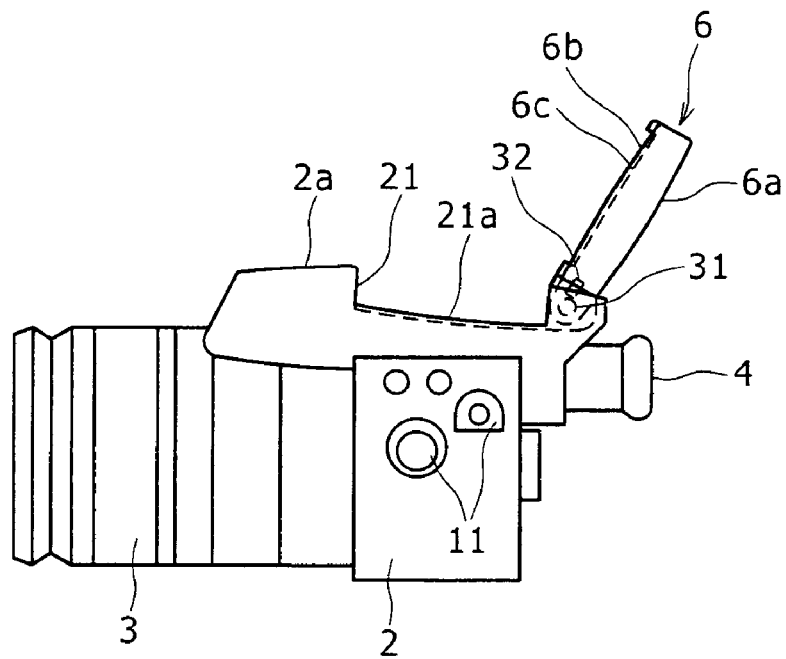
FIG. 7 is a side elevation of the image pickup device shown in FIG. 1, in which the display unit is raised in an inclined position.

To use the display unit 6, the display unit 6 is held between fingertips as indicated by two-dot chain lines in FIG. 1 and is raised up. Force applied to the display unit 6 to raise the same is transmitted through the second shaft 32 to the display support member 15, and the display support member 15 is turned on the first shafts 31. The display support member 15 can be turned through an angle of about 120° at a maximum as shown in FIG. 7.

Figure 8:
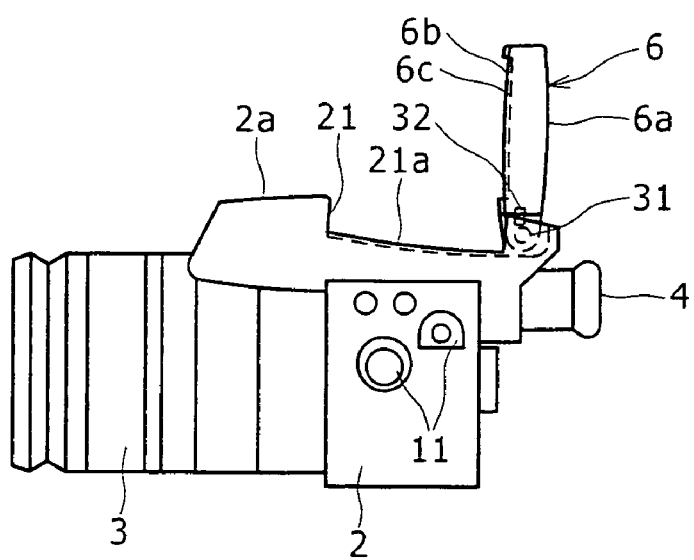
FIG. 8 is a side elevation of the image pickup device shown in FIG. 1, in which the display unit is set in an upright position.
Figure 9:
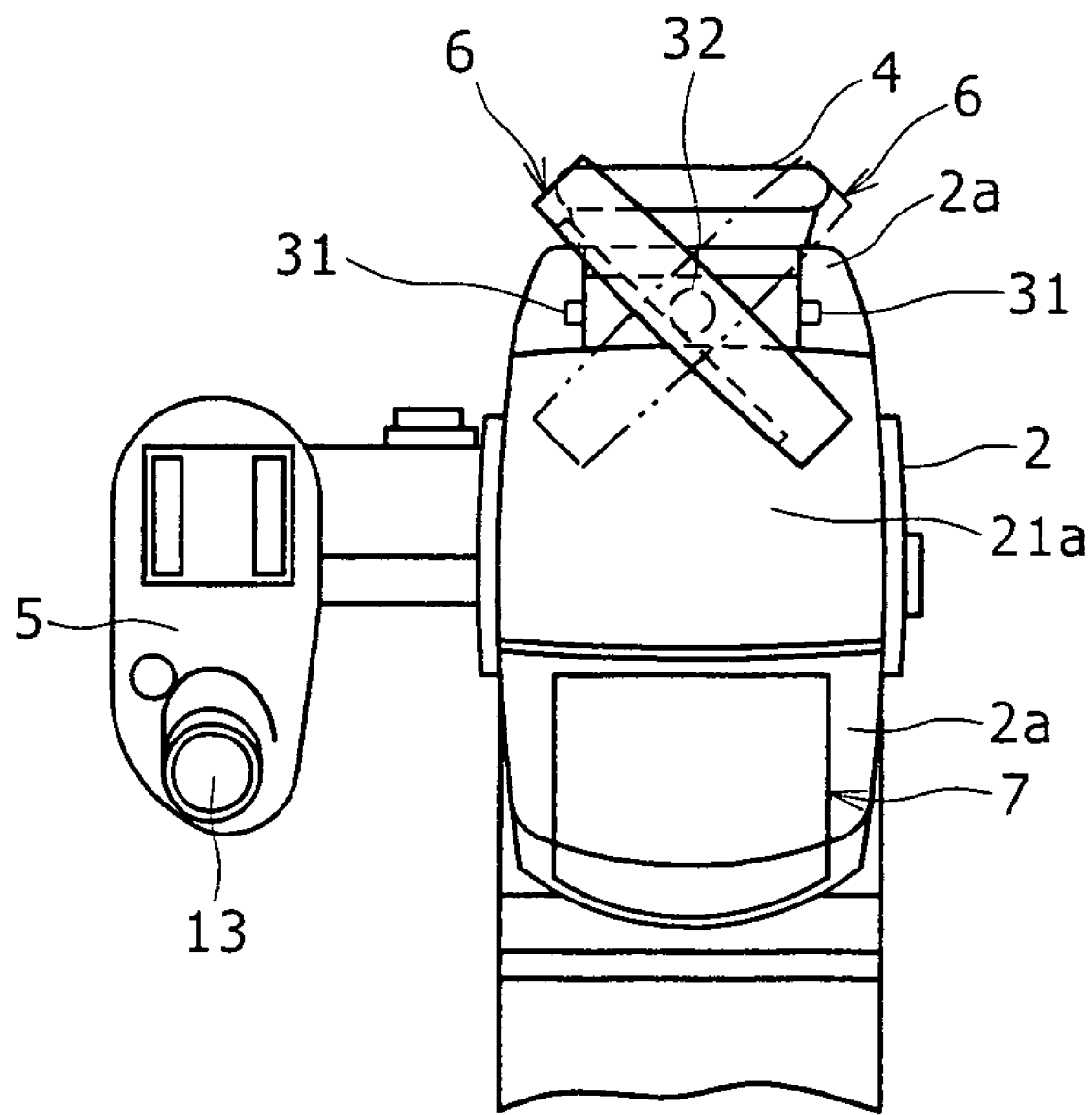
FIG. 9 is a plan view of the image pickup device shown in FIG. 1, in which the display unit has been turned on a second shaft through an angle of 45° from its home position.
Figure 10:
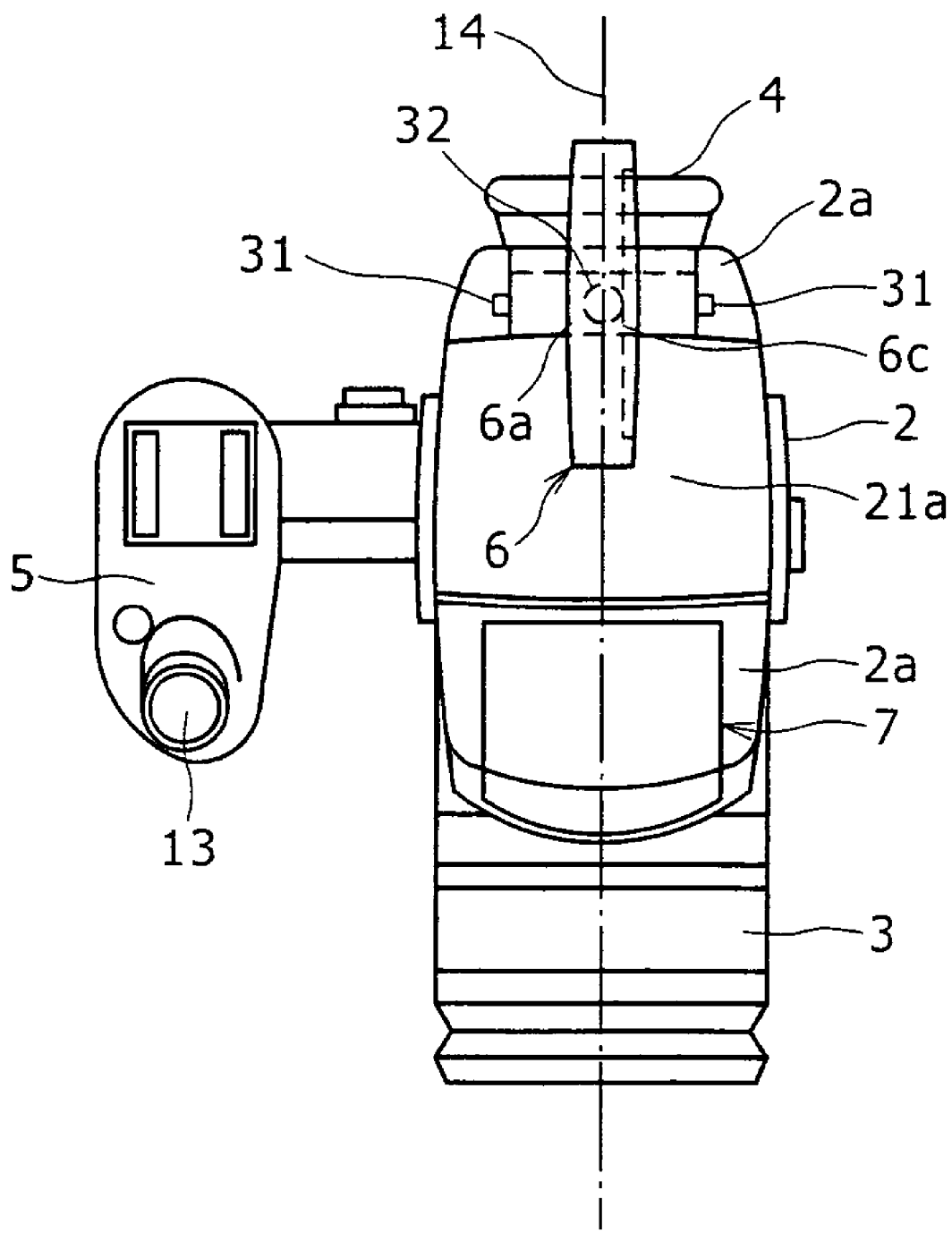
FIG. 10 is a plan view of the image pickup device shown in FIG. 1, in which the display unit has been turned on the second shaft through an angle of 90° from its home position.
Figure 11:
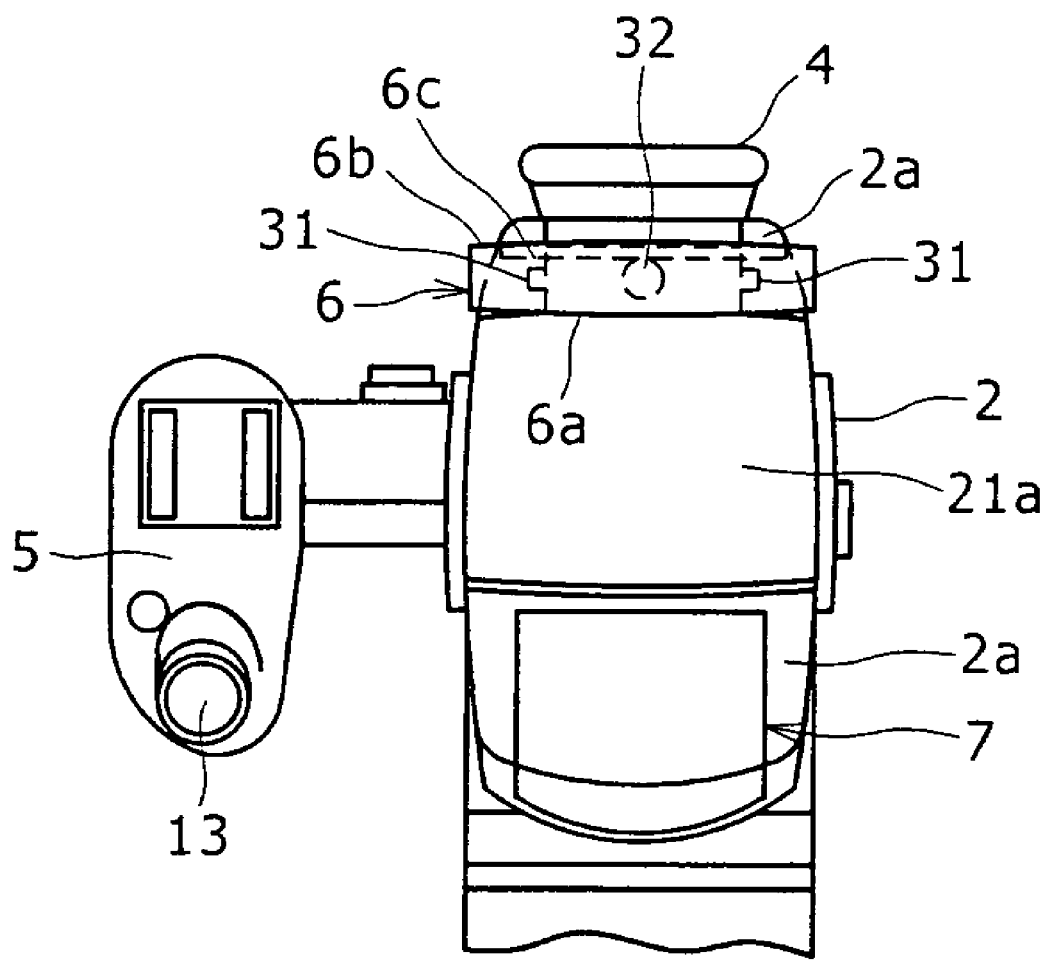
FIG. 11 is a plan view of the image pickup device shown in FIG. 1, in which the display unit has been turned on the second shaft through an angle of 180° from its home position.

The display unit 6 emerges from the first recess 21 after the display unit 6 has been turned through an angle greater than a predetermined angle. When the display unit 6 is set upright as shown in FIG. 8, the display unit 6 can be turned through an angle of 360°. When the display unit 6 contained in a vertical plane perpendicular to the optical axis 14 is turned clockwise or counterclockwise through an angle of about 45°, the display unit 6 extends at an angle of about 45° to the optical axis 14 as indicated by continuous lines or two-dot chain lines in FIG. 9. When the display unit 6 contained in a vertical plane perpendicular to the optical axis 14 is turned clockwise or counterclockwise through an angle of about 90°, the display unit 6 extends parallel to the optical axis 14 as shown in FIG. 10. In the state shown in FIG. 10, the screen of the LCD 6c faces right or left. When the display unit 6 contained in a vertical plane perpendicular to the optical axis 14 as shown in FIG. 4 is turned clockwise or counterclockwise through an angle of about 180°, the screen of the LCD 6c of the display unit 6 faces right backward as shown in FIGS. 11 and 12.

Figure 12:
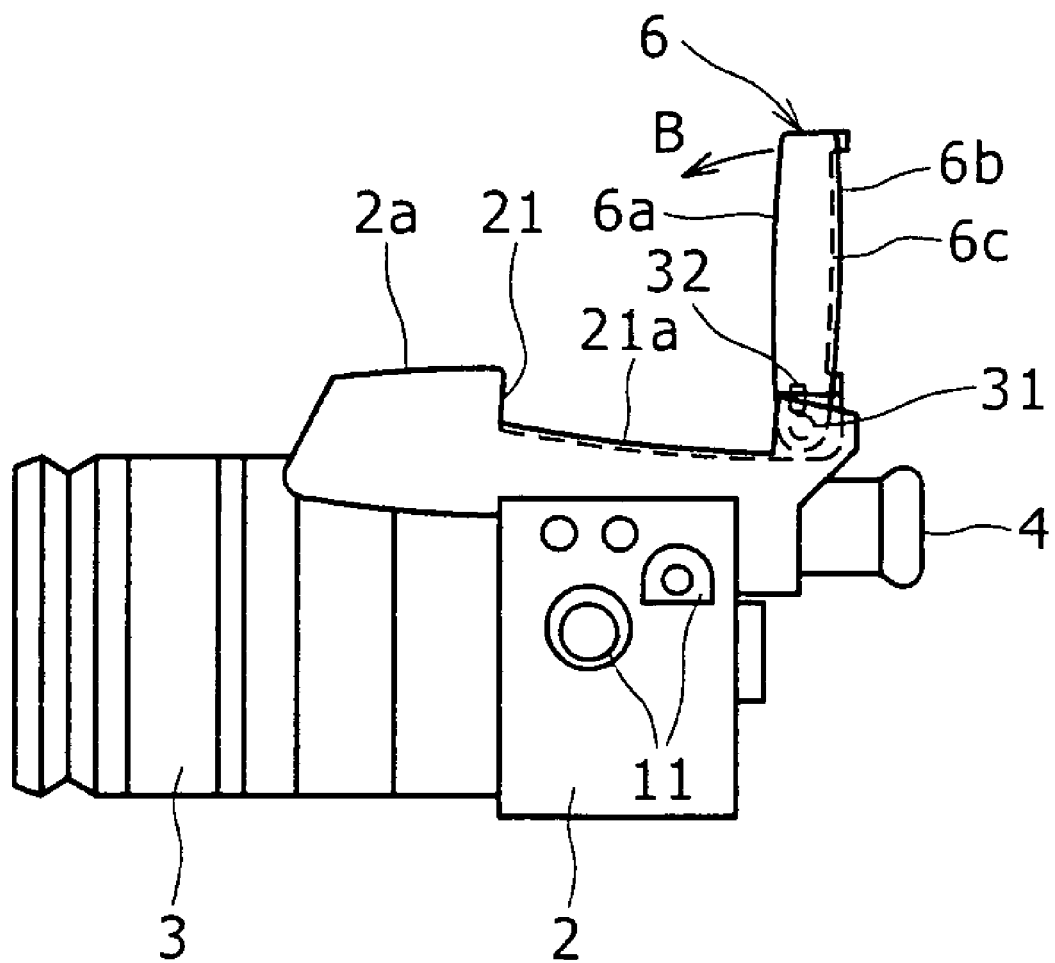
FIG. 12 is a side elevation of the image pickup device shown in FIG. 1, in which the display unit has been turned on the second shaft through an angle of 180° from its home position.
Figure 13:
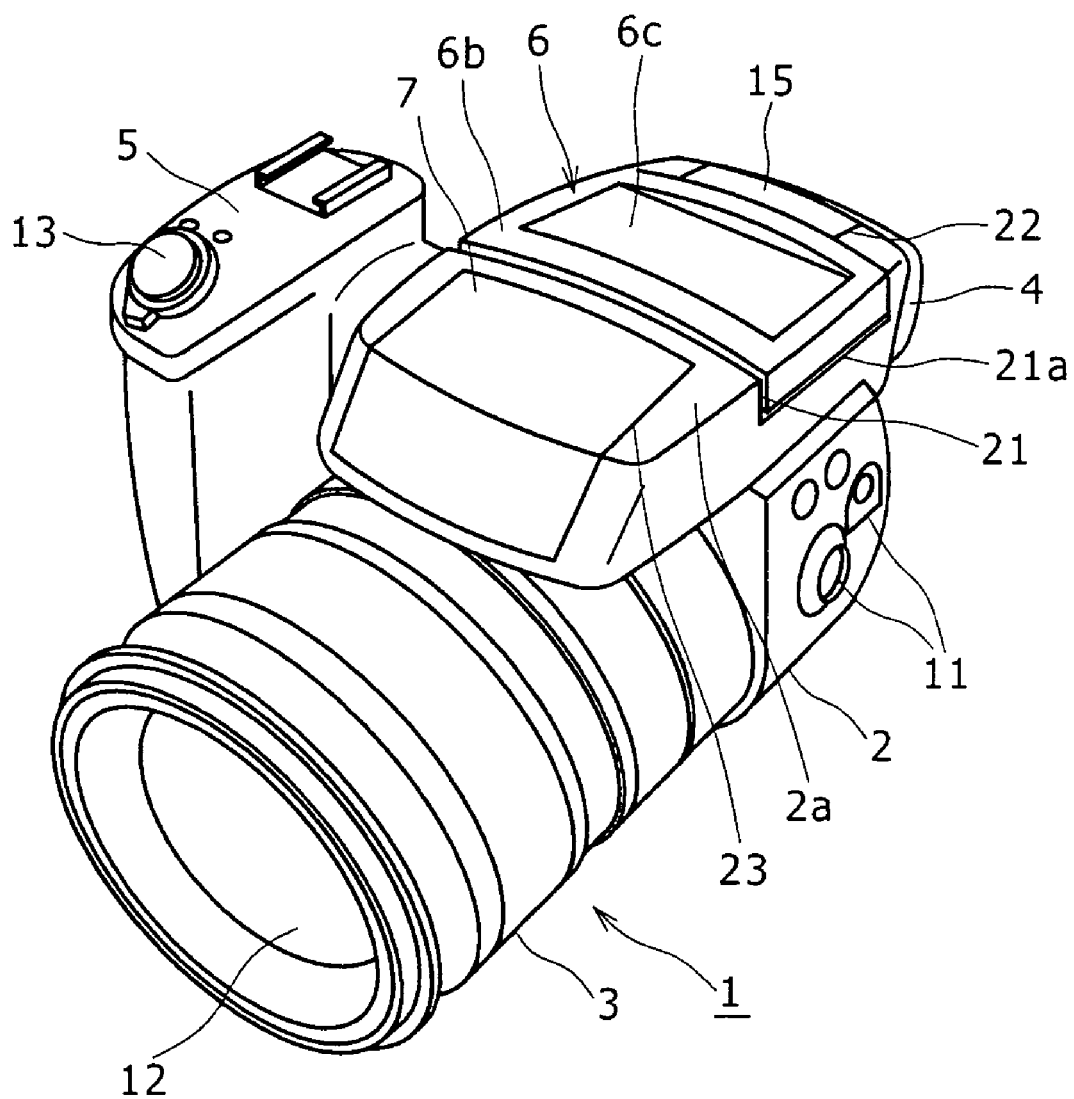
FIG. 13 is a perspective view of the image pickup device shown in FIG. 1, in which the display unit is folded down and held in the first recess.
Figure 14:
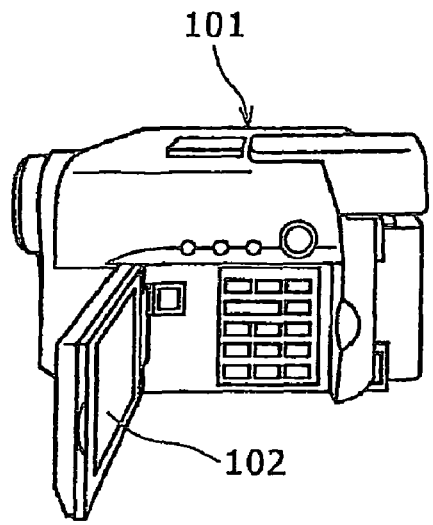
FIG. 14 is a perspective view of a known image pickup device.
Figure 15:
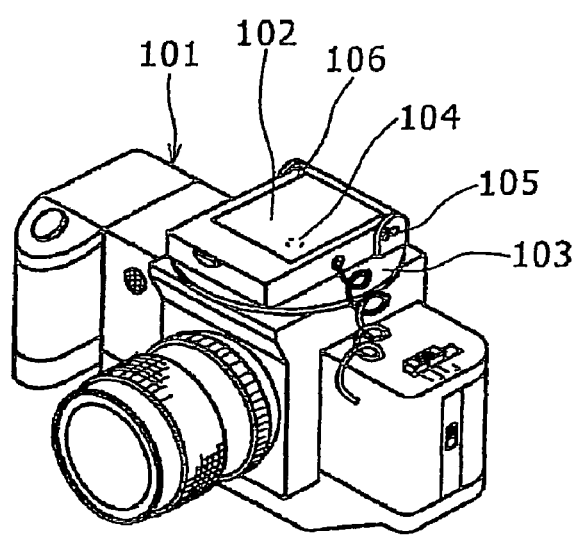
FIG. 15 is a perspective view of another known image pickup device.
Figure 16:
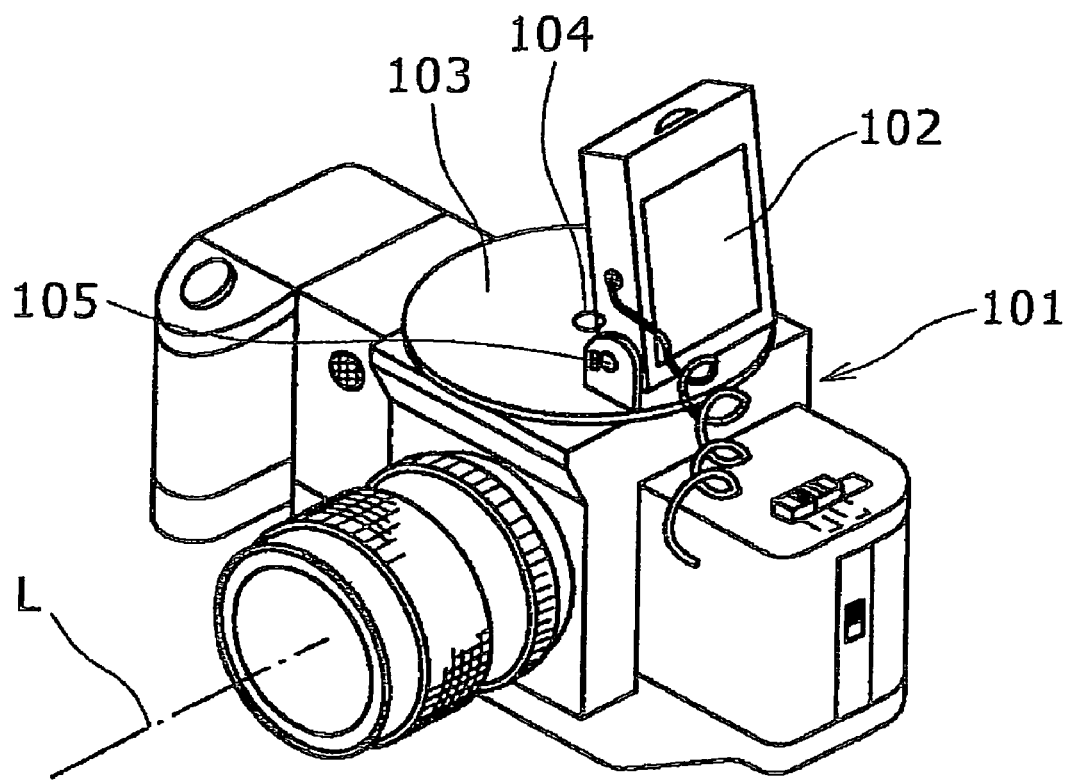
FIG. 16 is a perspective view of the image pickup device shown in FIG. 15, in which a display unit is raised up.

When the display unit 6 set in a position shown in FIG. 12 is turned in the direction of the arrow B, the display unit 6 is fitted in the first recess 21 with the screen of the LCD 6c facing up as shown in FIG. 13. Thus, the display unit 6 can be set in a desired angular position according to a camera angle suitable of forming an image of an object. Frictional resistances acting on the first shafts 31 and the second shaft 32 hold the display unit 6 in the desired angular position.

Since the second shaft 32 is disposed in the vertical plane containing the optical axis 14 of the camera body 2, the distance of dislocation of the display unit 6 from the optical axis 14 of the camera body 2 can be limited to the least unavoidable distance when the display unit 6 is turned on the second shaft 32 to any angular position.

Although the invention has been described as applied to the digital still camera with a certain degree of particularity, obviously many changes and variations are possible therein. It is therefore to be understood that the present invention is applicable to image pickup devices provided with a display unit other than digital still cameras, such as digital video cameras, and may be practiced otherwise than as specifically described herein without departing from the scope and spirit thereof.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup device comprising:
a camera body having an optical axis; and
a display unit serving as a monitor, supported for turning on an upper surface of the camera body by rotation about a first shaft, such that the display unit is configured to being folded in a horizontal position in a first recess on the upper surface of the camera body and configured to being set in a standing position at an angle to the upper surface of the camera body,
wherein the first recess configured to holding the folded display unit therein is formed in the upper surface of the camera body, and the display unit has a back surface which is substantially flush with the upper surface of the camera body when the display unit is held in the horizontal position in the first recess;
a flash unit recess formed in the upper surface of the camera body between the front of the image pickup device and said display unit;
a flash unit supported on the upper surface of the camera body to be aligned with the display unit along the optical axis of the camera body, said flash unit being movable between a folded position on the upper surface of the camera body and a standing position at an angle of the upper surface of the camera body, wherein the flash unit is held in the flash unit recess when the flash unit is in the folded position; and
a display support member that is supported by the first shaft in a second recess so as to be rotatable in a vertical plane located on a back part of the upper surface of the camera body and aligned with the display unit along the optical axis of the camera body and aligned with the optical access of the flash unit,
wherein the display unit is attached to the display support member and is configured to be raised from the first recess so as to project from the upper surface of the camera body by rotating the display support member in the second recess,
wherein the upper surface of the camera body and the back surface of the display unit have substantially the same shapes resembling a portion of the side surface of a barrel, and
wherein the back surface of the display unit, a display surface of the display unit, and a bottom surface of the first recess have substantially equal curvatures.

2. The image pickup device according to claim 1, wherein second recess is continuous with the first recess in the upper surface.

3. The image pickup device according to claim 1, wherein the display unit raised up from the upper surface of the camera body can be turned on the second shaft substantially through an angle of 360°.

4. The image pickup device according to claim 1, wherein the second shaft is disposed in a vertical plane containing the optical axis of the camera body.

5. An image pickup device comprising:
a camera body having an optical axis;
a display means for serving as a monitor, supported for turning on an upper surface of the camera body by rotation about a first shaft, such that the display means is configured to being folded in a horizontal position in a first recess on the upper surface of the camera body and configured to being set in a standing position at an angle to the upper surface of the camera body,
wherein the first recess is configured to holding the folded display means therein is formed in the upper surface of the camera body, and the display means has a back surface which is substantially flush with the upper surface of the camera body when the display means is held in the horizontal position in the first recess;

a flash recess formed in the upper surface of the camera body between the front of the image pickup device and said display means;

a flash means supported on the upper surface of the camera body to be aligned with the display means along the optical axis of the camera body, said flash means being movable between a folded position on the upper surface of the camera body and a standing position at an angle of the upper surface of the camera body, wherein the flash means is held in the flash means recess when the flash means is in the folded position;

a display support means that is supported by the first shaft in a second recess so as to be rotatable in a vertical plane located on a back part of the upper surface of the camera body and aligned with the display means along the optical axis of the camera body and aligned with the optical axis of the flash means, wherein the display means is attached to the display support means and is configured to be raised from the first recess so as to project from the upper surface of the camera body by rotating the display support means in the second recess, wherein the upper surface of the camera body and the back surface of the display means have substantially the same shapes resembling a portion of the side surface of a barrel, and wherein the back surface of the display means, a display surface of the display unit, and a bottom surface of the first recess have substantially equal curvatures.

6. The image pickup device according to claim 1, wherein the second shaft is disposed in parallel with the optical axis of the camera body when the display unit is held in the first recess.

7. The image pickup device according to claim 5, wherein the second shaft is disposed in parallel with the optical axis of the camera body when the display means is held in the first recess.

* * * * *